Patented Oct. 20, 1953

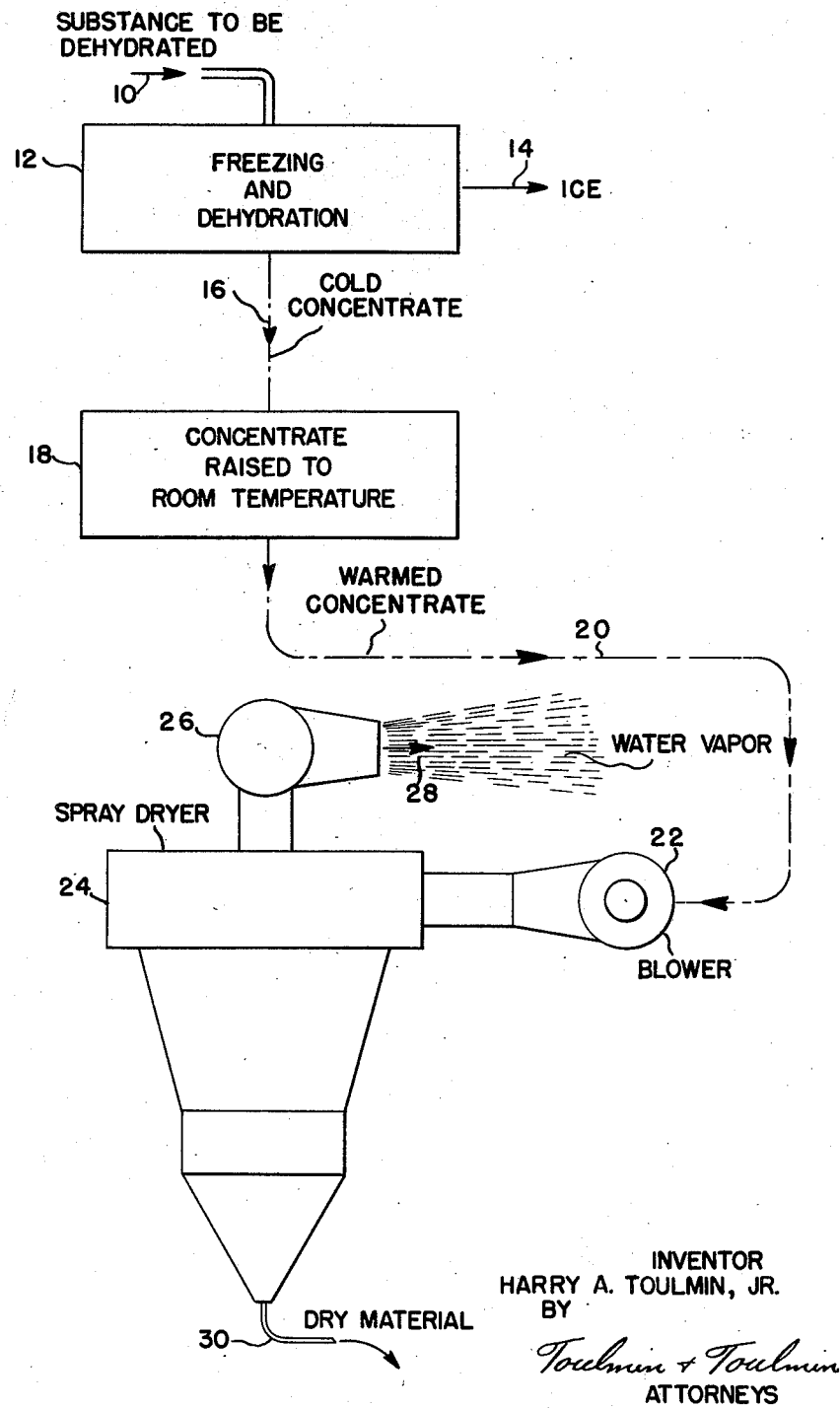

2,656,276

UNITED STATES PATENT OFFICE 2,656,276

DRIED OR EVAPORATED FOOD PRODUCT, ESPECIALLY MILK, AND THE PROCESS OF MAKING IT

Harry A. Toulmin, Jr., Dayton, Ohio, assignor to The Commonwealth Engineering Company of Ohio, Dayton, Ohio, a corporation of Ohio Application July 19, 1949, Serial No. 105,590

5 Claims. (Cl. 99—200)

1

This invention relates to a concentrated or dried food product and to a method of manufacturing it. Particularly, this invention relates to a dried or evaporated milk and the process of manufacturing it.

As is well known, the art of evaporating or drying milk and similar products is a large and commercially important industry. The advantages of evaporating or drying milk and similar products are many, and include greater ease of preserving the concentrated or dried product, ease of shipping or storing the same, and greater convenience to the consumer in transporting and storing the product.

However, as is equally well known, at the present time most of these products, and particularly milk, are characterized by a substantial change in taste after they have once been condensed or dried and then are rediluted to their original consistency for use. In connection with milk, this change in taste is particularly objectionable, and as a result, dried or evaporated milk has never come into popularity as a food arrived at by merely diluting the concentrated dried product. Rather, the use of such products is mainly limited to use in cooking and in combination with other food products.

The particular object of the instant invention is the provision of an improved dried or evaporated milk product and a process of manufacturing it, such that the concentrate is characterized by undergoing substantially no change in taste, so it can be diluted to its original consistency by the mere addition of water used in place of fresh milk.

A still further object of this invention is the provision of a method of dehydrating foods, such as milk, by means of which the water can be extracted from the substance either in whole or in part, but without imparting to the product the "cooked" taste characteristic of most dried milks.

Another particular object of this invention is to provide a process for manufacturing dried or evaporated milk, and in which the combination of freezing and evaporating is employed for extracting the water from the milk.

These and other objects and advantages will become more apparent upon reference to the following specification, taken in connection with the accompanying drawing, wherein there is illustrated, diagrammatically, a process according to this invention.

Referring to the drawings generally, it will be seen that a substance to be dehydrated or concentrated is introduced into the system, as at 10, and that the first stage that the substance goes through is a dehydration step by freezing. This is indicated by the rectangle at 12, and it will be seen that ice is extracted therefrom, as indicated by the arrrow 14, and a concentrate is passed to the next step in the cycle, as indicated by the arrow at 16.

The aforementioned concentrate is then raised to room temperature, as indicated by the rectangle at 18, and then is passed, as shown by line 20, to a blower 22 that blows the concentrate into a spray dryer 24. Within the spray dryer, the substance is subjected to the action of heated air, and a second blower 26 withdraws water vapor, as indicated at 28, while the further concentrated or dried material exits from the bottom of the spray dryer, as shown at 30.

Returning to the first step of the process, as indicated by the rectangle 12 and the lines 14 and 16, this step corresponds substantially to the process illustrated and claimed in the co-pending applications of George L. Cunningham, Serial Number 98,614, filed June 11, 1949, now U. S. Patent 2,602,750 and U. S. Patent 2,552,524, Serial Number 36,547, filed July 1, 1948, and assigned to the same assignee as the instant application.

This process is characterized by reducing the temperature of the substance to be concentrated until ice crystals form therein, and then moving the ice crystals and the substance in counterflow relationship and extracting ice from the substance at the point of greatest dilution of the substance. In this manner the crystals that are formed are encouraged to grow to considerable size, so that the carry-out or occlusion of the substance on the ice crystals is reduced to a minimum. Further, by removing the ice from the substance at the point where the substance is most dilute, the carry-out is still further reduced, because the ice crystals are washed with the dilute substance. The bulk or major portion of the water, for example up to 75% of the amount present in the liquid foodstuffs, may be removed by freezing and removing the water in the form of ice.

The extraction of water in the manner described above, and more fully set forth in the above-identified application, is characterized in that the resulting concentrate can be rediluted to its original consistency and substantially no change in taste, texture, or aroma is detected. This is due to the fact that the substances which impart taste and odor are not extracted by the freezing process. Also, it is known that when a mixture, solution, or emulsion is reduced to the temperature at which ice crystals form, the said crystals will consist of pure water, assuming that the solute is water. Due to this fact, there are none of the solids, fats, or oils of the substance being concentrated entrained in the ice, and, therefore, all of the flavoring material, as well as the vitamins, remain in the concentrate, whether they comprise liquids or solids.

The concentration of substances according to the freezing process described above, however, has its limitations, because, as the concentration of the substance proceeds, it becomes thicker and more viscous, and it becomes more and more difficult to extract the ice crystals therefrom without carrying with them an unusually large amount of the concentrate. Thus, at a point, the extraction of water from a substance by freezing and moving the ice crystals in counterflow with the substance, becomes impractical.

In connection with milk, with which this invention is particularly concerned, it is possible to extract water from the milk at least to the point that the resulting concentrate is the equivalent of commercial condensed milk. Considering whole milk, this has about eighty-seven per cent water, and skimmed milk has a somewhat higher percentage, because a substantial amount of fat is removed from whole milk to arrive at skimmed milk. For the purposes of this invention, milk can be considered to be either whole or skimmed milk, and, when this substance is reduced to a condensed state by a freezing and dehydration process as set forth above, the amount of water therein is somewhere between twenty-five and twenty-seven per cent. This limit of concentration is determined by economy, and it will be understood that, if desired, the concentration of the milk by freezing could be carried to a much higher degree.

Dried milk, as contrasted to condensed or evaporated milk, must have the water extracted therefrom until the percentage of moisture is somewhere between two and five per cent, and, therefore, in order to arrive at a highly concentrated or dried product, further steps must be carried out on the milk following the dehydration thereof by freezing, as explained above.

According to this invention, the concentrate which flows from the freezing and dehydration process, and which is naturally quite cold and contains ice crystals, is first raised at least to room temperature, thereby melting the ice. At this temperature, no deterioration of the product obtains, and none of the aforementioned substances therein which impart flavor and odor to it will pass therefrom. The warmed concentrate is then passed to a spray drier and therein undergoes a process during which the remaining amount of moisture which it is desired to extract from the concentrate is removed.

Within the spray drier the concentrate is atomized, by spray wheels, discs, cups, nozzles, jets, or other devices well known in the spray drying art, which will produce a fine mist of the material. Hot clean gas, such as air, is moved through the finely atomized spray and transmits heat to the individual particles of the spray, thereby evaporating the moisture therefrom and leaving behind the solids as a powder floating in the gas stream.

The powder is removed from the drier according to any of several methods, and any powder carried out by the stream of hot gases can be recovered therefrom by centrifuging or screening. Preferably, the powder is removed from the drier as rapidly as it forms therein and is immediately chilled and packaged.

The spray drier may have the hot gases so directed therethrough that a centrifuging action is had on the dry solids formed, thereby quickly separating them from the gas stream and leading to more efficient operation of the system, as well as further insuring against change of taste of the product.

The rapid action of the spray drier, in combination with the concentration by freezing, results in a product characterized by substantially no change in flavor or odor when reconstituted to its original dilution by the addition of the amount of water extracted.

The complete process according to this invention is, then, characterized in that the material to be concentrated is first subjected to a relatively slow freezing and dehydration step, and, thereafter to a relatively rapid evaporating step, so that the water is taken out by a combination of freezing it into the form of ice crystals and by evaporating the remainder into the form of water vapor.

The method according to my invention has great commercial significance in that it is a continuous process, and the substance being concentrated can be fed continuously into one end of the system and the dried or concentrated product extracted continuously from the other end. By avoiding batch treatment, a more uniform product is obtained, and favorable commercial practices can be observed in operating the plant.

It will be evident that while this invention is particularly concerned with the dehydration of milk, it is equally adaptable to many other substances, such as fruit and vegetable juices which it is desired to reduce to a concentrated form for ease of shipping and preserving.

It will be understood that I do not wish to be limited to the exact proportions, ratios, and other factors specifically set forth in the foregoing description and the accompanying drawing, but desire to comprehend such changes thereof as may be further desirable to adapt my invention to different conditions and usages.

I claim:

1. A process of concentrating liquid foodstuffs which may be reconstituted without substantial change in taste comprising reducing the temperature of the liquid foodstuff in successive stages to form ice crystals therein which are substantially pure water, moving the resultant partially frozen concentrate continuously in counter flow relationship to the flow of the ice crystals formed, removing a major portion of said ice crystals from the liquid foodstuff being concentrated at the point where the liquid foodstuff is most diluted, removing the concentrate and a portion of the ice crystals from the reduced temperature stages when extraction of the ice from the concentrate without carry-out of the concentrate becomes difficult, elevating the temperature of the concentrate removed to thaw the ice crystals therein, and rapidly evaporating the resultant concentrate to a water content of the desired value.

2. A continuous process of concentrating liquid foodstuffs which may be reconstituted without substantial change in taste comprising reducing the temperature of the liquid foodstuff in successive stages to form ice crystals therein which are substantially pure water, moving the resultant partially frozen concentrate substantially in counter-flow relationship to the flow of the ice crystals formed, removing a major portion of the ice crystals from the liquid foodstuff being concentrated at the point where the liquid foodstuff is most diluted, removing the concentrate and a portion of the ice crystals from the reduced temperature stages when extraction of the ice from the concentrate without carry-out of the concentrate becomes difficult, elevating the temperature of the concentrate to thaw the ice crystals therein, and evaporating the resultant concentrate under accelerated conditions to a water content of the desired value.

3. A process of concentrating liquid foodstuffs which may be reconstituted without substantial change in taste comprising reducing the temperature of the liquid foodstuff in successive stages to form ice crystals therein which are substantially pure water, moving the resultant partially frozen concentrate continuously in counter-flow relationship to the flow of the ice crystals formed, removing a major portion of the ice crystals from the liquid foodstuff being concentrated at the point where the liquid foodstuff is most diluted, removing the concentrate and a portion of the ice crystals from the reduced temperature stages when extraction of the ice from the concentrate without carry-out of the concentrate becomes difficult, elevating the temperature of the concentrate to thaw the ice crystals therein, and rapidly evaporating the resultant concentrate by subjecting the same to spray drying to produce a product having the desired moisture content.

4. A process of concentrating milk to produce a dehydrated product which may be reconstituted without substantial change in taste comprising reducing the temperature of the milk in successive stages to form ice crystals therein which are substantially pure water, moving the resultant partially frozen milk concentrate continuously in counter-flow relationship to the flow of the ice crystals formed, removing a major portion of said ice crystals from the milk being concentrated at the point where the milk is most diluted, removing the concentrate and a portion of the ice crystals from the reduced temperature stages when extraction of the ice from the concentrate without carry-out of the concentrate becomes difficult, elevating the temperature of the concentrate to thaw the ice crystals therein, and rapidly evaporating the resultant milk concentrate to a water content of the desired value.

5. A dehydrated milk product characterized by having the taste of fresh milk when reconstituted to its initial dilution by the addition of water, said milk being produced by reducing the temperature of the milk in successive stages to form ice crystals therein which are substantially pure water, moving the resultant partially frozen milk concentrate continuously in counter-flow relationship to the flow of the ice crystals formed, removing a major portion of said ice crystals from the milk being concentrated at the point where the milk is most diluted, removing the concentrate and a portion of the ice crystals from the reduced temperature stages when extraction of the ice from the concentrate without carry-out of the concentrate becomes difficult, elevating the temperature of the concentrate to thaw the ice crystals therein, and rapidly evaporating the resultant milk concentrate to a water content of the desired value.

HARRY A. TOULMIN, Jr.

References Cited in the file of this patent

UNITED STATES PATENTS

| Number | Name | Date |
|---|---|---|
| 163,182 | Gilmore | May 11, 1875 |
| 523,677 | McIntyre | July 31, 1894 |
| 723,152 | Gurber | Mar. 17, 1903 |
| 761,387 | Monti | May 31, 1904 |
| 919,616 | Monti | Apr. 27, 1909 |
| 994,555 | Alexander | June 6, 1911 |
| 1,167,006 | Monti | Jan. 4, 1916 |
| 1,211,361 | Sheehan | Jan. 2, 1917 |
| 1,576,137 | Johnson | Mar. 9, 1926 |
| 1,738,275 | Baker | Dec. 3, 1929 |
| 2,248,634 | Krause | July 8, 1941 |
| 2,440,676 | Dunkley | May 4, 1948 |